United States Patent Office 3,409,564
POLYMETHYLENEPIPERIDYL POLYMERS
Francis E. Cislak and Charles K. McGill, Indianapolis, and Frederic Porter Jack, Plainfield, Ind., assignors to Reilly Tar & Chemical Corporation, Indianapolis, Ind., a corporation of Indiana
No Drawing. Filed Apr. 19, 1965, Ser. No. 449,295
5 Claims. (Cl. 260—2)

ABSTRACT OF THE DISCLOSURE

Polymethylenepiperidyl polymers are disclosed. These polymers are prepared by heating together a mixture comprising a di-piperidyl alkane, a di-haloalkane, and alkali. They are characterized by having recurring in their molecular make-up the moiety

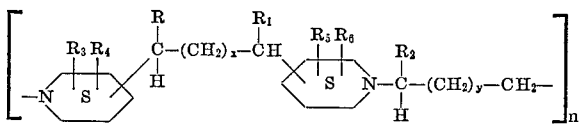

wherein R, $R_1$, $R_2$, $R_3$, $R_4$, $R_5$, and $R_6$ represent hydrogen or lower alkyl, they may be alike or they may be different; $x$ and $y$ represent small integers, they may be alike or they may be different. These polymers improve the dyeability of filamentary materials, such as polyethylene or polypropylene.

---

This invention relates to a new composition of matter. More particularly, it relates to new polymethylene piperidyl polymers, which polymers have recurring in their molecular make-up the grouping:

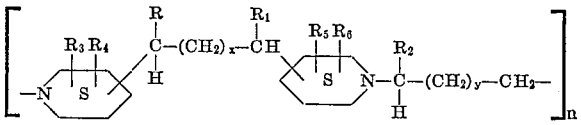

wherein R, $R_1$, $R_2$, $R_3$, $R_4$, $R_5$, and $R_6$ represent hydrogen or lower alkyl, they may be alike or they may be different; $x$ and $y$ represent small integers, they may be alike or they may be different.

Our new polymers are characterized by the presence of a strong tertiary nitrogen in their molecular make-up. They are useful in the formulation of rust preventive coatings for steel.

The piperidine nitrogen affords a good point of attachment for acid dyestuffs. The incorporation of from 2% to 10% of our polymer in such difficultly dyeable filamentary materials as polyethylene or polypropylene greatly improves their ability to bring dyed.

Our polymers are also effective as inhibitors of the action of acids upon steel. Thus, a 5% solution of our new polymers in heavy coal tar bases is useful in inhibiting the action of dilute non-oxidizing mineral acids in the pickling of steel or of hydrochloric acid in acidizing of oil wells.

In general, our new polymers may be prepared by heating together a mixture comprising a di-piperidyl alkane, a di-haloalkane, and alkali. Some of them may be prepared by reacting a di-piperidyl alkane with butadiene, using metallic sodium as a catalyst.

The following examples illustrate the manner in which our invention may be carried out. They are given by way of example only and are not to be construed as a limitation of our invention.

Example 1

A mixture of 210 grams of 1,3-di-(4-piperidyl)propane, whose formula is,

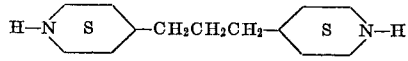

99 grams of ethylene dichloride, 100 grams of sodium hydroxide, and 1,000 grams of water are placed into a flask equipped with a stirrer and a reflux condenser. While stirring it, the mixture is heated under reflux conditions (90–100° C.). A reaction occurs and a polymer separates from the aqueous mixture. The heating and stirring are continued for about four to six hours. Then the polymer is separated from the mixture by filtration. It is dried in an oven.

The polymer formed is characterized by having recurring in its molecular make-up the grouping:

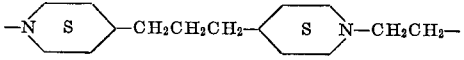

The polymer is insoluble in water but is soluble in dilute mineral acid. It is soluble in hydrocarbon solvents.
It softens at above about 160° C.
It has a nitrogen content of about 12%.

Example 2

The procedure of Example 1 is repeated with the exception that in place of the 1,3-di-(4-piperidyl)propane we use 1,3-di-(2-piperidyl)propane whose formula is:

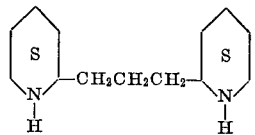

The resulting polymer has recurring in its molecular make-up the grouping:

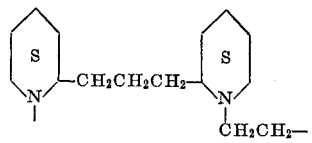

Example 3

The procedure of Example 1 is repeated with the exception that in place of the 1,3-di-(4-piperidyl)propane we use 224 grams of 1,4-di-(4-piperidyl)butane, whose formula is:

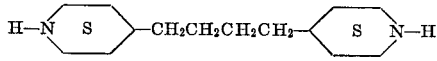

The resulting polymer has recurring in its molecular make-up the moiety:

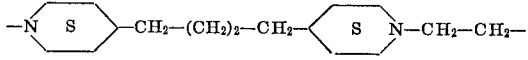

Example 4

The procedure of Example 1 is repeated with the exception that we use 244 grams of 1,6-dibromohexane in place of the 99 grams of ethylene dichloride. The resulting polymer has recurring in its molecular make-up the moiety:

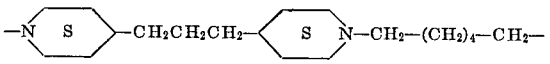

Example 5

The procedure of Example 1 is repeated with the exception that in place of the 1,3-di-(4-piperidyl)propane we use 1,3-di-(3-piperidyl)propane whose formula is:

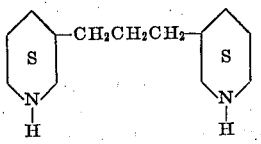

The resulting polymer has recurring in its molecular make-up the moiety:

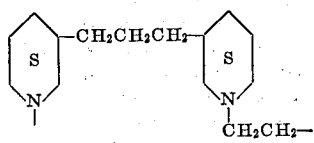

Example 6

The procedure of Example 1 is repeated with the exception that in place of the 1,3-di-(4-piperidyl)propane we use 1-(2-piperidyl)-3-(4-piperidyl)propane whose formula is:

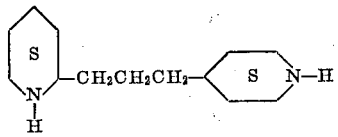

The resulting polymer has recurring in its molecular make-up the moiety:

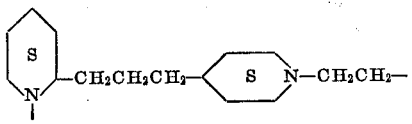

Among the other di-piperidyl alkanes that may be used to make our polymethylenepiperidyl polymers are:

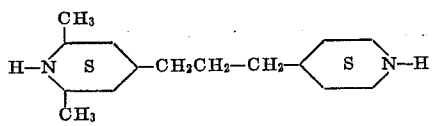

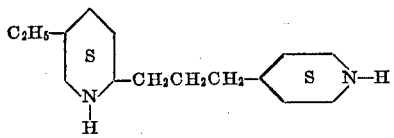

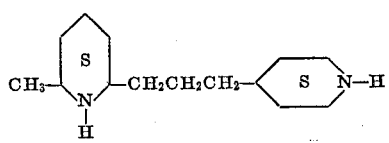

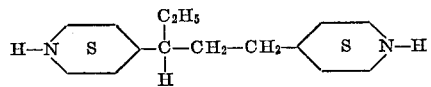

and the like.

We claim as our invention:

1. Polymethylenepiperidyl polymers consisting essentially of recurring units of the formula:

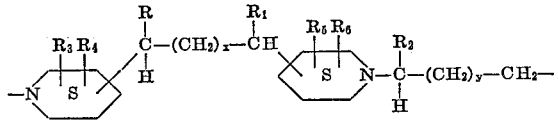

wherein R, $R_1$, $R_2$, $R_3$, $R_4$, $R_5$, and $R_6$ represent a member of the class consisting of hydrogen and lower alkyl; $x$ and $y$ represent small integers from 0 to 4.

2. Polymethylenepiperidyl polymer consisting essentially of recurring units of the formula:

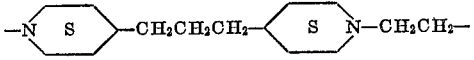

3. Polymethylenepiperidyl polymer consisting essentially of recurring units of the formula:

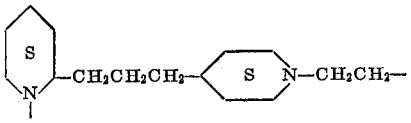

4. Polymethylenepiperidyl polymer consisting essentially of recurring units of the formula:

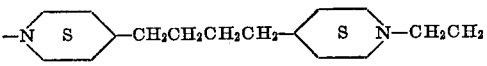

5. The process of preparing a polymethylenepiperidyl polymer which comprises heating a di-piperidylalkane of the formula

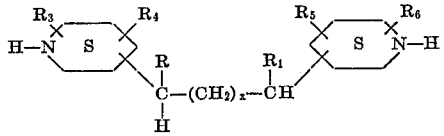

wherein R, $R_1$, $R_3$, $R_4$, $R_5$, and $R_6$ represent hydrogen or lower alkyl and $x$ is an integer from 0 to 4, a di-halogenoalkane of the formula

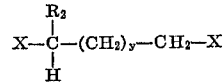

wherein $R_2$ represents hydrogen or lower alkyl, X is halogen and $y$ is an integer from 0 to 4, and an alkali.

References Cited

UNITED STATES PATENTS

| | | | |
|---|---|---|---|
| 3,370,042 | 2/1968 | Rieger et al. | 260—67.5 |
| 2,692,243 | 10/1954 | Szwarc | 260—2 |

SAMUEL H. BLECH, *Primary Examiner.*